(12) United States Patent
Weinmann

(10) Patent No.: US 6,386,044 B1
(45) Date of Patent: May 14, 2002

(54) MULTI-DEPTH DEFLECTOMETER AND METHOD

(75) Inventor: Thomas L. Weinmann, Buffalo Grove, IL (US)

(73) Assignee: Construction Technology Laboratories, Inc., Skokie, IL (US)

( * ) Notice: Subject to any disclaimer, the term of this patent is extended or adjusted under 35 U.S.C. 154(b) by 0 days.

(21) Appl. No.: 09/429,720

(22) Filed: Oct. 29, 1999

(51) Int. Cl.[7] .............................. G01B 5/00; G01B 7/16; G01L 1/00; G01N 3/00; G01N 33/24

(52) U.S. Cl. ........................................... 73/784

(58) Field of Search ..................... 73/784, 146, 783, 73/82, 579, 151, 801, 786, 800, 81, 85, 864.74

(56) References Cited

U.S. PATENT DOCUMENTS

| | | | | |
|---|---|---|---|---|
| 4,719,803 A | * | 1/1988 | Capelle et al. ............... | 73/784 |
| 5,046,366 A | * | 9/1991 | Basson et al. ............... | 73/784 |
| 5,753,808 A | * | 5/1998 | Johnson ....................... | 73/146 |

OTHER PUBLICATIONS

Excerpt from "A Review of Instrumentation Technology for the Minnesota Road Reseach Project", Van Deusen et al., Minnesota Dept. of Transportation, pp. 30–34 ("In–Situ Displacement Measurements") plus bibl., 1992.

* cited by examiner

Primary Examiner—Benjamin R. Fuller
Assistant Examiner—Octavia Davis
(74) Attorney, Agent, or Firm—Joan I. Norek; The Law Office of Joan I. Norek

(57) ABSTRACT

A multi-depth deflectometer provides use and fabrication advantages. It is comprised of a head member that normally is disposed at the very mouth of a bore hole, an elongated tail member extending down through the bore hole. Displacement transducers are removably positioned within the head member which can be opened from the surface. The transducers can be easily placed in or removed by hand. The first trackings of subsurface deflections are done through mechanical deflection anchors located at desired measuring levels within the tail member. The deflection anchors have transverse-bite actuators and are each separately in vertical-actuation communication with one of the transducers. A method of implementing the MDD reflects the use and fabrication advantages also.

8 Claims, 4 Drawing Sheets

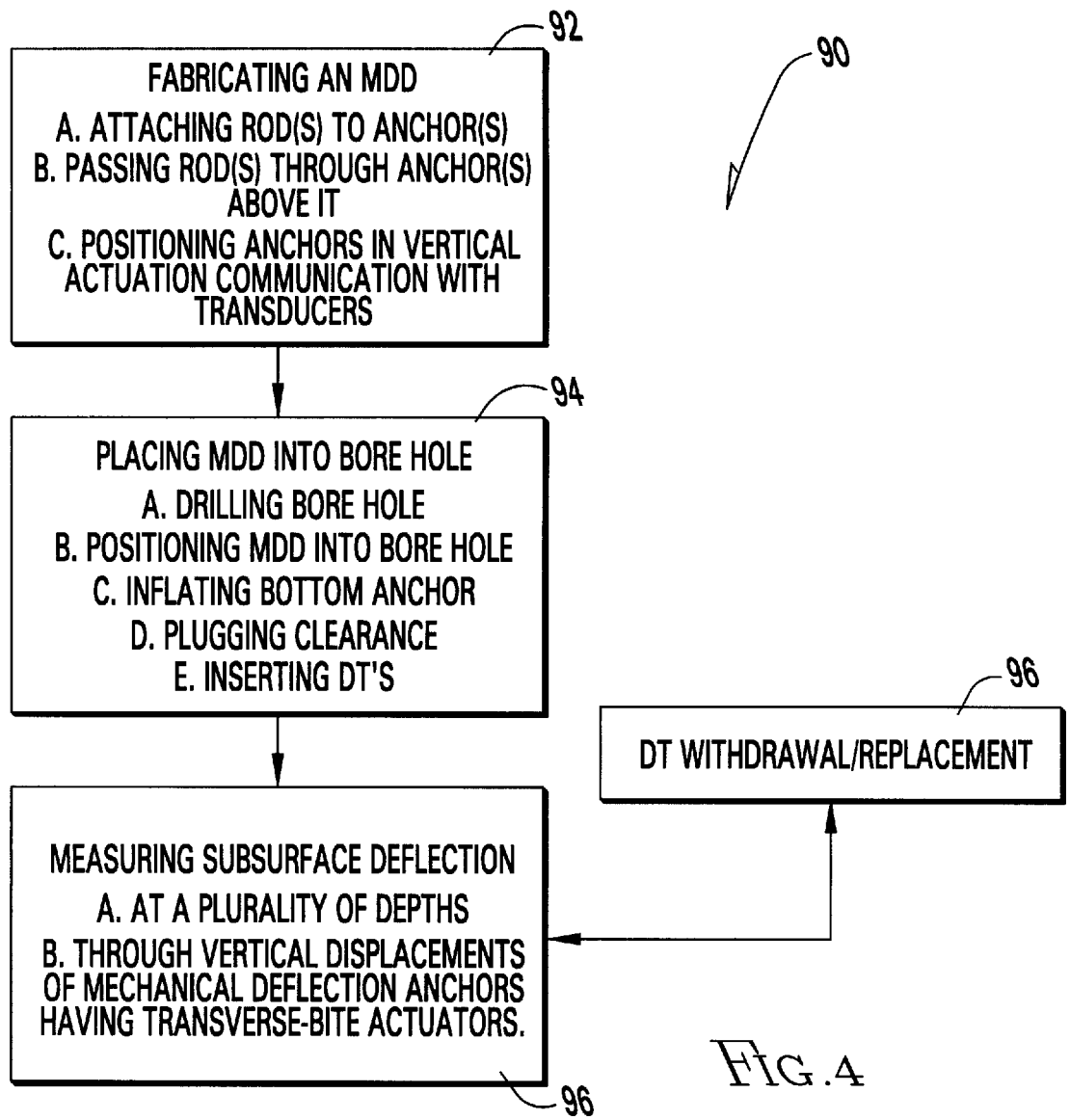

MULTI-DEPTH DEFLECTOMETER AND METHOD

BACKGROUND OF THE INVENTION

Soil encountered close to the earth's surface is one of the most important engineering materials in the fields of civil, highway, airfield and architectural engineering. The load bearing capacity of the soil supporting highways, airfield runways and other pavement systems is of immense importance to the integrity of the pavement. This load-bearing capacity, or soil stiffness, changes from time to time and can vary from place to place within a given area.

Soil stiffness is the degree of resistance to deformation upon loading. Soil will generally undergo at least a certain degree of deformation when subjected to load. Overall soil deformation is due mainly to distortion and compression. Distortion is the elastic deformation of soil solids. Compression is the volume change resulting from expulsion of moisture from pores (voids), and is called consolidation. The extent and time-dependence of, and the degree of recovery from, deformation is primarily dependent upon the soil's properties, existing stress conditions and stress history.

Soil properties in turn are determined by a variety of complex interrelated factors, including without limitation soil composition particle size, particle-size distribution, and the like), weight-volume relationships (solids/moisture/vapor/voids proportions, density and the like), engineering properties (cohesion, consistency, structure, permeability, water/soil interactions and the like) and in-situ stresses (vertical overburden stress, hydrostatic stress and the like).

The stability or load-bearing capacity (capability) of the pavement of airport runways, highways and other pavement systems is determined in significant part by the load-bearing capacity of the underlying (subpavement) earth or soil, which may deteriorate over time due to environmental and stress influences on soil properties. For instance, changes in soil load-bearing conditions due to changes in moisture content and/or repeated loading over time are well recognized in engineering fields. In addition, certain pavement systems such as runways and highways typically endure repeated severe loadings on a daily basis.

The proper determination of existing bearing-load capacities of soil-supported pavement systems requires that the existing soil conditions be defined and evaluated. Conventional soil-structure modeling is based on the results of laboratory testing of individual localized soil samples. Laboratory test methods, however, are severely disadvantaged because the test conditions and the soil sample (specimen) are not representative of in-situ conditions. Absent are (a) in-situ overburden stress, (b) in-situ soil interactions, and the like. Further many if not most soil samples have been disturbed to some degree during sampling and handling. A true composite soil stiffness determination can only be determined using actual stiffness data of in-situ soil conditions at varying depths (varying subgrade conditions). In addition, while soil samples from individual lifts of soil placement can be obtained with relative ease before and/or during construction of the pavement system, thereafter the overlying structure generally precludes sampling of the supporting soil by nondestructive methods.

Another known method for determining composite soil stiffness is the use of plate bearing tests on the surface of soil layers after placement and compaction of each, prior to placement of another layer above. These results, while meaningful, only provide results at that point in time, and do not provide localized information regarding individual areas at specific depths of the soil layers.

Soil stiffness determinations require (a) the application of a predetermined surface force and (b) the measurement of the resultant deflection or vertical deformation of the soil. Apparatus for applying a predetermined surface force are well known. Apparatus for measuring resultant deflection at the surface are also known. The challenge is the instrumentation and methodology needed to obtain actual stiffness data of in-situ soil conditions at varying depths to obtain the data necessary for the definition and evaluation of existing soil conditions, and then to properly determine existing bearing-load capacities of the overlying pavement system.

The most direct method of measuring composite and individual soil layer stiffness and deflections is through the use of a multi-depth deflectometer ("MDD"). A known type of MDD utilizes a linear array of vertically linked displacement transducers for measurements at multiple depths. The transducers used in that linear array are known as "linear variable displacement" transducers ("LVDT") and are commercially available. They are fabricated as modules some four to six inches in length which are themselves positioned in vertical alignment within a bore hole at the desired subsurface measuring levels. Interconnecting rods link the LVDT's one above another within the bore hole. The soil-gripping mechanism of LVDT's are sidewardly extending ball bearings that require activation with a custom tool after subsurface placement. The lengths of the linked LVDT module preclude the measurement of layers that are closer than about six to twelve inches (that is, the distance between ball-bearing sets of adjacent and closely spaced LVDT's). Another drawback inherent in this known MDD is that the failure of just one of the linked LVDT's in a strand (in series electrical arrangement) results in the total failure of the instrument. Any displacement transducer can, for instance, fail from overload. The LVDT's of this known MDD are also at risk of failure from contact with, or submersion in, water because they are exposed to subsurface water. The proposed solutions to the water-exposure risk are either hermetically sealing of the subsurface apparatus, which would be a costly addition, or the very expensive use of fully submersible transducers at a cost of about $1,000 apiece. The standard LVDT's are relatively expensive and other MDD components are expensive and difficult to install. The installation time reported in the literature is twelve hours over two separate days. (The anchor must be installed a day before the other components.) This MDD cannot be prefabricated because activation of ball bearings must be performed after subsurface placement and the top of the LVDT being activated must accessible by a special tool. Therefore a higher-positioned LVDT cannot be connected to the strand until activation of the LVDT positioned below.

It is desirable to measure soil stiffness at multiple depths using instrumentation and methodologies that provide rapid and preferably continuous measurements through an automated system to reduce the time and the costs of taking measurements, and to avoid operator exposure to traffic.

Preferably the instrumentation is relatively inexpensive to fabricate and inexpensive to install. Preferably the instrumentation can be readily installed either during construction of the pavement system and or during post-construction time periods with substantially nondestructive installation methods that do not jeopardize the pavement system. Preferably the instrumentation is a completely prefabricated assembly so that field installation is rapid.

Preferably the instrumentation includes multiple transducers, each of which will continue to function despite the failure of another. Preferably the electronic components are both accessible for adjustment if there is a disruption or failure, for instance due to an overload, and preferably the electronic components are not exposed to subsurface water without the expense of hermetically sealing the down-hole components. Preferably only simple mechanical components of the instrumentation are installed at subsurface positions, while the more delicate electrical components are positioned in more readily accessible locations.

Preferably the instrumentation can be readily fabricated with a virtually unlimited number of transducers for concomitant deflection-measurements at a virtually unlimited number of depths. Preferably the measurement depths can be relatively close to one another, for instance such as within about one or two inches of each other.

The deflections being measured are typically extremely small, for instance often no more than 0.01 inch or even less. Another challenge is to provide the apparatus and methodology that provide the desirable characteristics mentioned above while accurately measuring such minute deflections.

BRIEF SUMMARY OF THE INVENTION

The present invention provides a multi-depth deflectometer comprised of a head member that normally is disposed at the very mouth of a bore hole, and an elongated tail member extending down through the bore hole. Displacement transducers are removably positioned within the head member which can be opened from the surface. The transducers can be easily placed in or removed by hand. The first trackings of subsurface deflections are done through mechanical deflection anchors located at desired measuring levels within the tail member. The deflection anchors have transverse-bite actuators and are each separately in vertical-actuation communication with one of the transducers. The present invention is also a method of implementing the MDD of the invention.

BRIEF DESCRIPTION OF THE SEVERAL VIEWS OF THE DRAWING

FIG. 2A is a schematic top plan view of the arrangement of displacement transducers in the road box of FIG. 2;

FIG. 4 is a flow diagram of the method of the present invention.

DETAILED DESCRIPTION OF THE INVENTION

Figure 1:
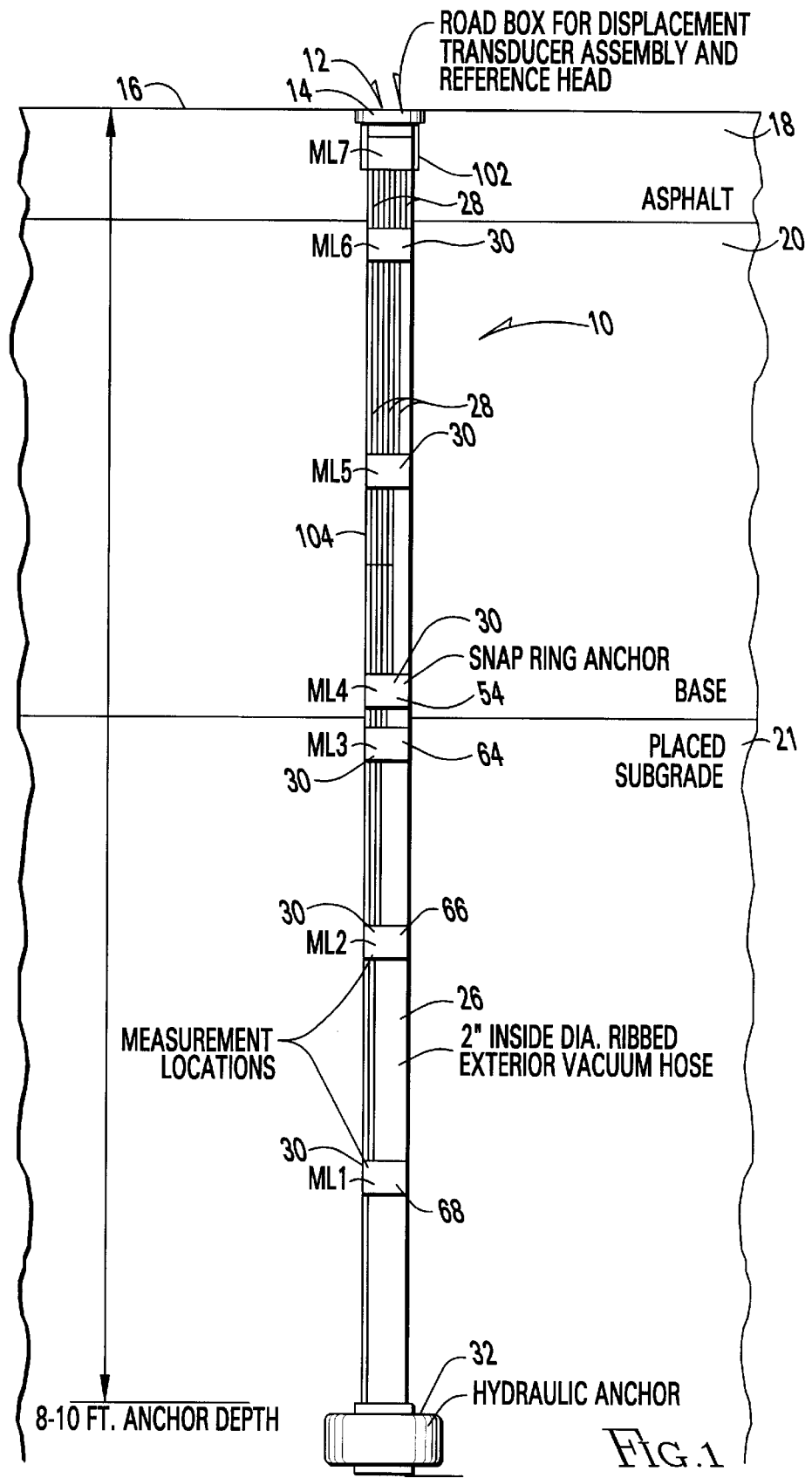
FIG. 1 is a schematic side view of an installed MDD of the invention.
Figure 2:
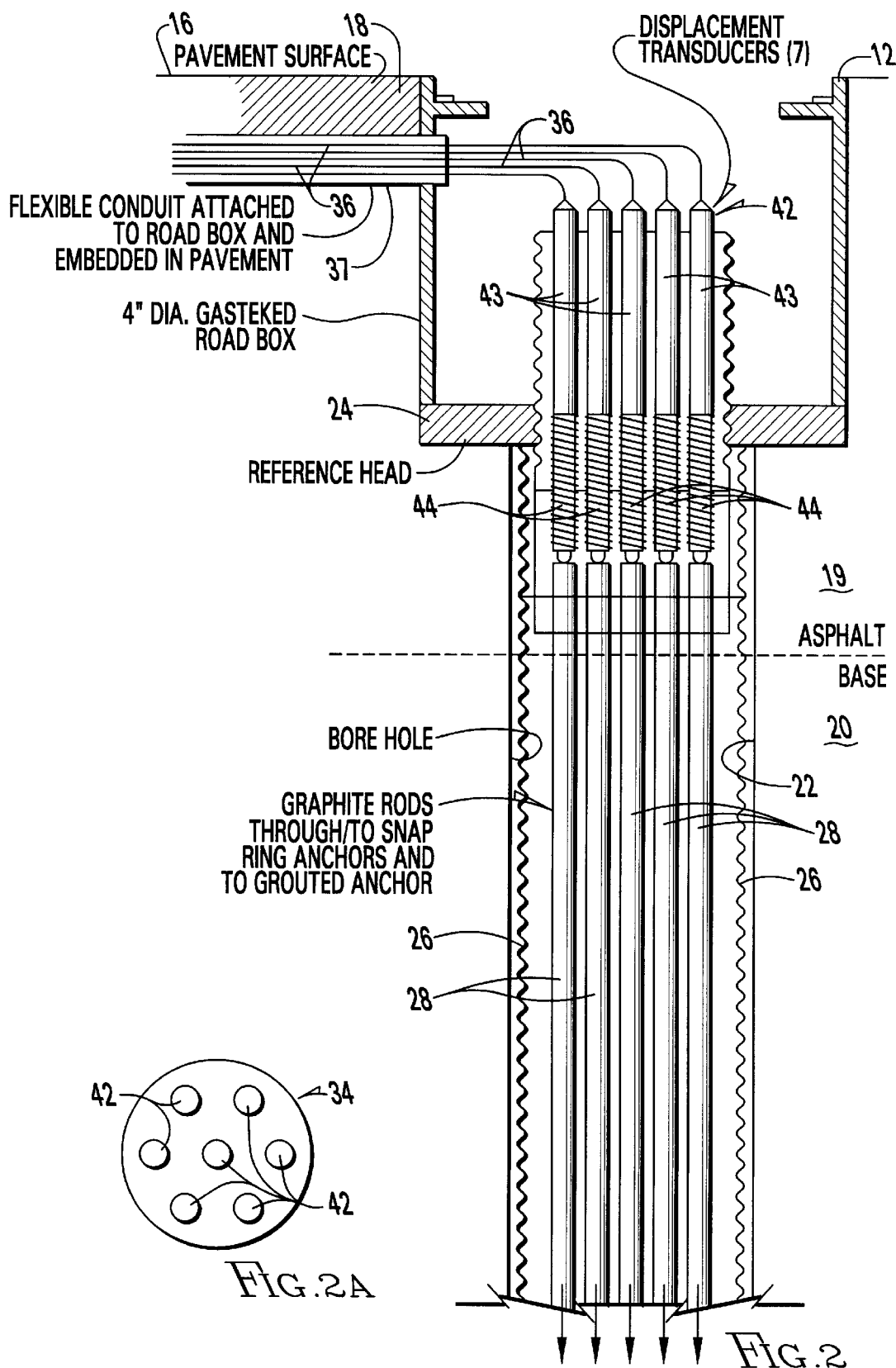
FIG. 2 is a schematic side view of enlarged details of the road box area of the MDD of FIG. 1.
Figure 3:
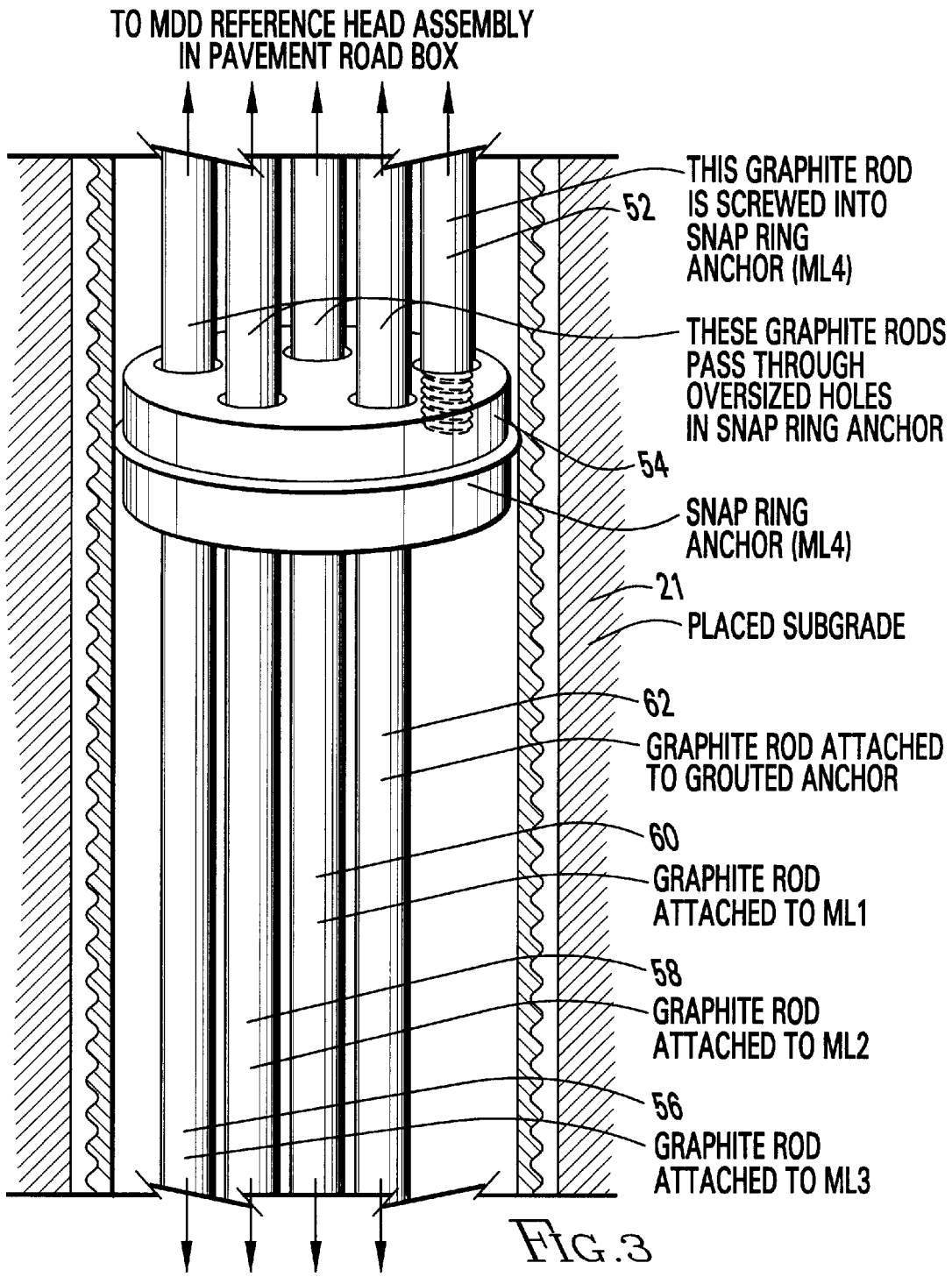
FIG. 3 is a schematic side view of enlarged details of one of the snap ring anchor areas of the MDD of FIG. 1.

In FIG. 1 there is shown in schematic cross-sectional side view an MDD of the present invention, designated generally by the reference number 10, installed in a pavement system. The MDD 10 as shown is installed with its uppermost component, a capped road box 12, positioned with the upper surface of its cap 14 about level with the upper or exterior surface 16 of a pavement 18. The pavement 18 as shown could be the pavement of an airport runway or the pavement of a highway or other like upper structure of a pavement system. The pavement 18 includes asphalt 19 as shown, beneath which is a base 20 and below that is placed subgrade 21. In FIG. 2 there is shown in enlargement the details of road box 12 (with its cap 14 removed) and surrounding components and a part of its electrical circuitry. In FIG. 3 there is shown in enlargement the details of the MDD components at one of the measuring levels.

The MDD 10 is positioned within a subsurface bore hole 22 and is comprised of the road box 12, a reference head assembly 24, a longitudinally-flexible conduit or hose 26, a plurality of elongated rods 28, a plurality of snap ring anchors 30, a bottom anchor 32, and within the road box 12 is a displacement-transducer assembly 34 having leadwires 36 running out from the road box 12 through a leadwire conduit 37 to a conventional data acquisition system (not shown).

Briefly in more detail, the leadwire conduit 37 is flexible, and is attached to the road box 12 and is embedded in the pavement 18 as shown. The road box 12 as shown is a four-inch gasketed road box. The rods 28 are graphite rods which run down through/to snap ring anchors 30 and a bottom grouted anchor 32 as described in detail below.

The MDD 10 is an elongate instrument with the top of its road box 12 flush with the top surface of the pavement 18. The MDD 10 is substantially held in place by virtue of its bottom anchor 32 at about its lowest end, opposite the road box 12. The bottom anchor 32 as shown is a known type of hydraulic anchor. The anchor 32 is connected to the hose 26 by a snap ring or conventional mechanical attachment elements, and is positioned at an anchor depth of about eight to ten feet below the pavement surface 16. The term "anchor depth" as used herein and as used conventionally refers to the depth of an anchor element as measured at the top bearing surface of the anchor. The bottom anchor 32 is attached to the MDD assembly before field installation in a collapsed state, for instance the anchor 32 having an inflatable bladder that is in a collapsed state during the lowering of the MDD 10 into the bore hole 22. After the anchor 32 set in place at the bottom of the bore hole 22, it is grouted and oil is pumped down into the anchor 32 (for instance into the anchor's bladder, not shown) through a very narrow tube with a one-way check valve (not shown), whereby the anchor 32 swells out, anchoring the MDD at the bottom of the bore hole 22.

The MDD 10 as shown extends through the pavement 18, through asphalt 19, a base layer of soil 20 (typically a granular base), and then down through placed-subgrade soil layer 21. The bottom anchor 32 is embedded in the placed-subgrade layer 21. The anchor 32 is sufficiently heavy and sufficiently wide (when swollen) so that it sufficiently anchors the MDD 10 in its installed position, the only MDD movement being permitted is the longitudinal flexing of the hose 26 as explained below.

The road box 12 rests on the reference head assembly 24 and these two components are attached by set screws (not shown) or other conventional mechanical fasteners. The displacement-transducer assembly 34 is comprised of a plurality (seven) of individual transducers 42 ("DT") seated within holes within the reference head assembly 24 and otherwise substantially enclosed within the road box housing 12, The bodies 43 of the transducers 42 are positioned above, and sit within, the base member of the reference head assembly 24, while their outwardly spring-biased plungers 44 extend down through the base. The reference head assembly 24 and the road box 12 generally are wider than the diameter of the bore hole 22 below, being seated within a wider bore-hole mouth, and thus are sufficiently anchored into position. Aside from the displacement of the reference head assembly with any deflection of the pavement 18 about its upper surface 16, the reference head assembly 24 is otherwise a fixed reference head.

The displacement transducers 42 are each spring-loaded inexpensive miniature potentiometers, sometimes referred to as linear position transducers. Each transducer 42 has a lead wire 36 running from its top out of the road box 12 through the conduit 37. As shown that conduit 37 is about a four-foot long flexible PVC conduit that is attached to the road box 12 through which there is access the leadwires 36. The conduit 37 runs through the pavement 18 out to the side of the pavement (not shown). The leadwires 36 each run to the data acquisition system where the signal is read and at times recorded (not shown). The road box 12 as shown is a four-inch diameter gasketed road box, which is an off-the-shelf conventional component. The road-box cap 14 is a removable cap which permits the transducer assembly to be serviced from the exterior surface of the pavement 18.

Each displacement transducer 42 sits on top of one of the rods 28, its plunger 44 in contact therewith, but is not otherwise connected or attached to the respective rod. The snap ring anchors 30 (six shown) are positioned in vertical alignment within the hose 26 (which is within the bore hole 22) below the road box 12. The snap ring anchor 30 shown in detail in FIG. 3 is the snap ring anchor at the fourth measuring level (taking the first measuring level as the lowest measuring level). As seen particularly in FIG. 3, one of the rods 28, designated as the ML-4 rod 52 (rod fixed at measuring level 4) is screwed into this fourth-measuring-level snap ring anchor 30 in conventional manner. (The snap ring anchors described and depicted herein are off-the-shelf conventional components.) The ML-4 rod 52 is fixed at its distal end to the ML-4 snap ring anchor 54. Four other rods 28 pass through oversized holes in the ML-4 anchor 54. These four rods are a ML-3 rod 56, a ML-2 rod 58, a ML-1 rod 60, and a BA rod 62. The ML-3 rod 56, ML-2 rod 58, and ML-1 rod 60 are each separately fixed to lower depth snap ring anchors 30 (not shown in FIG. 3) that are designated respectively as ML-3 snap ring anchor 64, ML-2 snap ring anchor 66, and ML-2 snap ring anchor 68 in FIG. 1. The BA rod 62 is fixed at its distal end to the bottom anchor 32. (The center-positioned transducer 42 sits on the BA rod 62 and thus is a seventh measuring level.) The ML-4 snap ring anchor 54 thus has oversized holes through which pass all rods 28 which extend down to lower depths. The ML-4 snap ring anchor 54 has a single affixed rod that bridges the snap ring anchor to one of the transducers 42 in the road box 12. All of the snap ring anchors 30 are alike in this manner, being affixed to a single rod. 28 on which is seated a single transducer 42, and having oversized holes through which separately pass rods 28 which extend down to lower depths. For simplicity, only ML-4 snap ring anchor 54 shown in detail in FIG. 3 will be described in detail herein, to avoid repetition of such details.

The snap ring anchors 30, as represented by the ML-4 snap ring anchor 54 shown in detail in FIG. 3, has a circumferential, outwardly extending ring or flange 70 that expands and bears against or bites the inner wall 72 of the hose 26. As mentioned above, the hose 26 is externally ribbed or corrugated, and those external hose ribs 74 can been seen in the detail of FIG. 3. The hose ribs 74 in and of themselves grip or bite into the medium external to the hose 74. The annular clearance between the hose 26 and the wall of the bore hole 22 is filled after installation with sealing and/or plugging agent 80, such as a bentonite composition commercially available under the trademark of Benseal from Bariod Industrial Drilling Fluids of Houston, Tex. When for instance the Benseal bentonite composition is used, it is wetted in place, where is swells and seals up the clearance. The sealing and/or plugging agent assures that the ML-4 snap ring anchor 54 will move vertically with the immediately external medium. Thus the vertical movement of the ML-4 snap ring anchor 54 follow the vertical movement of the hose 26 which in turn follows the vertical movement of the soil. The vertical movement of a snap ring anchor is and should be a measure of the vertical movement of the soil at that depth. A sufficient sealing and/or plugging agent should tie the movement of the hose 26 to the movement of the soil without influencing soil deflection. The affixed ML-4 rod 54 will in turn follow the vertical movement of the ML-4 snap ring anchor 54, and the extent of longitudinal movement (or vertical displacement) of the ML-4 rod is traced or tracked by the transducer 42 which is seated on that rod. In this fashion subsurface soil deflections are accurately measured with transducers 42 in the displacement transducer assembly 34 just below the pavement surface. Although not shown with precision in the schematic drawings, the bore hole 22 is only slightly wider than the hose 26. The radial separation distance is about ⅛ inch.

The elongated rods 28 must be rigid, and preferably are formed of a non-metallic graphite composite that has a sufficiently low coefficient of thermal expansion and is substantially resistant to degradation by the environmental influences within the hose 26 over long time periods. The MDD of the present invention might well be in continued operation, or at least continually in place for intermittent operation, for years. The rods 28 must have sufficient and sustained integrity so that each continues reflecting accurately subsurface soil deflecting at the depth of its snap ring anchor over the useful life of the MDD. Graphite composite rods are sufficient for these purposes.

The hose 26, as mentioned earlier, is longitudinally flexible. The hose 26 must nonetheless be sufficiently rigid in directions other than longitudinally to resist crushing from compacted soil. A suitable off-the-shelf hose is a conventional 2 ⅝ inch diameter vacuum hose. The hose 26 should be impervious to moisture transport or leakage. The hose 26 as shown and in preferred embodiment is connected to the bottom anchor 32 is attached. The internal areas within the hose 26 are not hermetically sealed, and need not be water tight. The displacements of the rods 28 are not influenced by moisture or other environment conditions. (The rod displacements track the soil deflections at the depth of the respective snap ring anchor, which soil deflections may well be influenced by the water content of the soil.)

As best seen in FIG. 1, there are six snap ring anchors 30 disposed at substantially equidistant intervals along the longitudinal length of the MDD. Three are positioned within the base soil layer and three are positioned in the placed subgrade soil layer. Upon the application of a force to the pavement 18, for instance a rolling load imitating a heavy vehicle or landing airplane, the MDD will provide an accurate record of soil deflection versus time at the pavement level as well as at six separate depths simultaneously. A proper determination of existing bearing-load capacities of the overlying pavement can be better determined. Unlike laboratory test methods, the soil deflection is being determined in existing in-situ conditions. Present are (a) in-situ overburden stress, (b) in-situ soil interactions, and the like. Further the soil structure has not been disturbed by sampling and handling. The MDD of the present invention provides actual soil stiffness data of in-situ soil conditions at varying depths (varying subgrade conditions). In addition, these measurements are in no way precluded or disadvantaged by the overlying structure. The MDD of the present invention also provides localized information regarding individual areas at specific depths of the soil layers and can track the change of soil stiffness with time.

The MDD of the present invention has no electrical components linked in series. Each of the transducer/rod/ring anchor sets are separate component combinations having no influence on one another despite their action in measuring deflections at different depths along the same vertical line. If one transducer or other component of a set should fail for any reason, only the measurement at one depth is lost. The other transducer/rod/ring anchor sets will be unaffected, and will continue to function. If a transducer should fail, for instance from displacement overload, it can be reached and readjusted at pavement level merely by opening the road box cap 14. The lead wires 36 are also very accessible for replacement and/or repair. In other words, only sample mechanical components of the MDD of the present invention are installed at inaccessible subsurface positions, while the more delicate electrical components are positioned in readily accessible locations at or near the surface.

When it is desired to measure soil deflections at closer depths than shown for instance in FIG. 1, an MDD can be simply fabricated with its snap ring anchors spaced apart by as little as about one or two inches without the displacements of one anchor influencing the displacements of adjacent anchors.

In addition, the MDD shown in FIG. 1 to 3 is inexpensive to fabricate and install. All of its components are off-the-shelf items and assembly is simple. The rods 28 are cut or otherwise fabricated to the desired lengths, which determine the measuring levels of the snap ring anchors 30. The rods 28 are then screwed into or otherwise separately attached to the tops of snap ring anchors 30. The rod/anchor sets are then assembled by passing each rod 28 through bores in the snap ring anchors 30 to be positioned above its anchor 30. The bottom anchor 32, in deflated condition, is attached to the hose 26 via a snap ring anchor and the longest rod is attached to that ring anchor. The rod/anchor sets are positioned within the hose 26, and the annular flanges 48 on the anchors 30 are expanded so that they bite into the inner surface of the hose 26. The road box 12 is set onto the reference head assembly 24 and secured thereto in conventional manner. The upper end of the hose 26 is attached to the bottom of the reference head assembly in conventional manner with the top ends of all the rods separately extending through holes in the reference head base. For convenience or efficiency or for any other reasons, these steps can be done in other than the order presented here. Regardless of the order of these steps, the MDD 10 is essentially prefabricated, avoiding any fabrication steps in the field other than the insertion of the transducers into the reference head assembly 24. Delaying the transducer-insertion step is a safety factor, reducing risk of transducer breakage. Then in the field, the bore 22 is drilled, the MDD 10 is placed into the bore hole 22, the bottom anchor 32 is inflated by feeding oil down into it through a thin tube, the plugging agent 80 is fed into the clearance between the MDD 10 and bore hole 22 and wetted. A strip of pavement from the road box 12 to the side of the pavement is broken, and the lead wire conduit is placed therein. (The broken strip is then of course sufficiently filled over.) And finally the transducers 34 are placed into the reference head assembly 24, each seated upon one of the rods. The entire field installation can easily be completed in three hours or even less time.

Again, installation of the MDD of the present invention is simple and rapid. The entire MDD can and preferably is prefabricated. In the field the installation only requires (a) the drilling of a bore hole of sufficient depth and length, (b) the lowering of the MDD into the bore hole, and (c) filling-the annual space between the hose and the bore hole wall. This simple and rapid installation provides a cost savings as to the number of installation persons required and the time they are required to spend. This simple and rapid installation provides a cost and savings and convenience advantages because there is little pavement-system down time required. If the pavement system is an airport runway or highway, the costs and disadvantages of a prolonged closed-to-users period are apparent.

In addition, the MDD of the present invention can be readily fabricated with a virtually unlimited number of transducers for concomitant deflection-measurements at a virtually unlimited number of depths. Only practical considerations regarding primarily the diameter of the bore hole would constrain the number of transducer/rod/ring anchor sets that can be combined in a single MDD.

The MDD of the present invention will provide rapid measurements through an automated system, reducing the time and the costs of taking measurements. The measurement signals being transmitted from the MDD 10 can be read continuously or intermittently. They can be recorded automatically using instrumentation well known in the field, or they can be recorded by and. Further, the operator can be stationed at the side of the pavement or at a remote location which ever is more convenient or otherwise desirable at the time. Remote location operation avoids exposure to traffic during the measurement period. In addition, after the taking of the desire measurements, the transducers can merely be removed by simply withdrawing them out from the reference head assembly 24 through the top of the road box 12, and the MDD 10 otherwise left in place for use at a later time. Later use of course will involve nothing more than the replacement of the transducers. The MDD 10 sans the transducers is at minimal risk of damage or deterioration even if left in place for years. Since the transducers are relatively delicate, and are so easy to remove and replace, there is no reason for leaving them in place during extended periods of non-use. Nonetheless, given the relatively protected position of the transducers in the reference head assembly 24, if desired the transducers would be at little risk if left in the MDD for extended time periods.

The design simplicity of the MDD of the present invention in no way detracts from its ability to accurately measure extremely small soil deflections, for instance deflections of no more than 0.01 inch or less.

The present invention is a multi-depth deflectometer comprised of: a head member designated generally by the reference number 102 as shown in FIG. 1, an elongated tail member designated generally by the reference number 104 as shown in FIG. 1 extending from its proximal end longitudinally downward from the head member, and a plurality of displacement-transducer assemblages. Each displacement-transducer assemblage comprises a displacement transducer and a deflection anchor. The deflection anchor has a transverse-bite actuator and is in vertical-actuation communication with the transducer. The transducer of each assemblage is located within the head member; and the deflection anchor of each assemblage is located in the tail member. Each deflection anchor is a member of a longitudinal alignment of the deflection anchors. In preferred embodiments the tail member further includes a bottom anchor structure at about the distal end of the tail member. In preferred embodiments the multi-depth deflectometer further includes a bottom anchor in longitudinal alignment with the longitudinal alignment of the deflection anchors, wherein the longitudinal alignment of the deflection anchors is disposed between the head member and the bottom anchor. In preferred embodiments at least one of the plurality of displacement-transducer assemblages further includes a rigid rod element having a first and second opposed ends. This rigid rod element is in vertical-actuation communication with the transducer of the assemblage at the first end and is affixed to the deflection anchor of the assemblage at the second end. The rigid rod element thereby provides the vertical-actuation communication between the transducer and the deflection anchor of the assemblage. In preferred embodiments the plurality of displacement-transducer assemblages includes a first and a second displacement-transducer assemblage, and (a) the first assemblage is positioned closer to the head member than the second assemblage, (b) the second assemblage further includes a rigid rod element has a first and second opposed ends, (c) the rigid rod element is in vertical-actuation communication with the transducer of the second assemblage at the first end and is affixed to the deflection anchor of the second assemblage at the second end, (d) the rigid rod element provides vertical-actuation communication between the transducer and the deflection anchor of the second assemblage, and (e) the rigid rod element passes through the deflection anchor of the first assemblage. In preferred embodiments the tail member further includes an elongated lining and the deflection anchors of the longitudinal alignment of deflection anchors are disposed within the lining and are in vertical actuation communication with the lining. In preferred embodiments the lining has an external high-friction surface.

In further preferred embodiments the plurality of displacement-transducer assemblages includes a first and a second displacement-transducer assemblage. The first assemblage is positioned closer to the head member than the second assemblage and includes a first transducer, a first deflection anchor and a first rigid rod element. The second assemblage includes a second transducer, a second deflection anchor and a second rigid rod element. The first and second rigid rod elements each separately has a proximal end and a distal end. The first and second rigid rod elements separately are in vertical-actuation communication with respectively the first and second transducer at its proximal end and separately are affixed to respectively the first and second deflection anchor at its distal end. The first and second rigid rod element each separately provides vertical-actuation communication between respectively the first and second transducer and respectively the first and second deflection anchor. The second rigid rod element passes through the first deflection anchor. In preferred embodiments, he tail member further includes a bottom anchor structure, wherein the bottom anchor structure is in vertical-actuation communication with a third displacement transducer via a third rigid rod element. This third displacement transducer is also located within the head element, and the head element further includes a transversely-extending arm member that assures the head member itself acting as a transverse-actuation anchor. The third rigid rod element (a) is in vertical-actuation communication with the third displacement transducer, (b) is affixed to the bottom anchor structure and (c) separately passes through the first and second deflection anchors.

The present invention also is a placed device for measuring deflection at subsurface depths which is comprised of:
 (a) a head member which is comprised of a reference head assembly, at least one linear movement sensor, and a housing, the housing at least partially encompassing the sensor;
 (b) a tail member which is comprised of at least one anchor element, a bottom anchor structure and an elongated conduit has an upper and lower end, the conduit is attached to the head member at the upper end of the conduit, the conduit is attached to the bottom anchor structure at the lower end of the conduit, and the anchor element is disposed within the conduit at a position between the upper and lower end of the conduit;
 (c) wherein the head member is seated within a mouth of a bore hole, and the bore hole mouth is proximate to a surface of a pavement system;
 (d) the tail member is disposed within the bore hole, the conduit extending downward from the bore hole mouth to the bottom anchor structure, the bottom anchor structure having shoulders which provide resistance to upward movement of the anchor along the bore hole;
 (e) the anchor element has at least one circumferential bearing member which bears against the inner surface of the conduit opposite an area of external high-friction potential surface of the conduit;
 (d) the conduit is vertically flexible at least along a section against which the bearing member bears;
 (e) the anchor element is in vertical-actuation, communication with the sensor; and
 (f) the conduit is in vertical-actuation communication with the soil proximate the bore hole at least along the section against which the bearing member bears.

In preferred embodiments the placed device further includes a plurality of the linear movement sensors and a plurality of the anchor elements. Each of the anchor elements is preferably disposed within the conduit at a position between the upper and lower end of the conduit. Each of the anchor elements preferably has at least one the circumferential bearing member which bears against the inner surface of the conduit opposite an area of external high-friction potential surface of the conduit. Each of the anchor elements separately is in vertical-actuation communication with one of the sensors, and each of the sensors is an element of the head member. In further preferred embodiments the placed device further includes a plurality of the linear movement sensors and plurality of the anchor elements, the plurality of linear movement sensors and plurality of a anchor elements comprising a plurality of sensor/anchor sets. Each of the sensor/anchor sets preferably is in electrical isolation from other sensor/anchor sets. The placed device may further include an access way to the reference head assembly proximate the surface of the pavement system. The placed device may further include at least one of the anchor element that is spaced apart from a neighboring the anchor element no more than about two inches.

The present invention also is a method of implementing a multi-depth deflectometer of the invention, the method 90 comprising (see FIG. 4) placing the multi-depth deflectometer within a bore hole 94, and measuring subsurface deflection at a plurality of depths through vertical displacements of the deflection anchors 96. The bore hole preferably has a bore hole mouth proximate to a pavement system surface, and the multi-depth deflectometer is placed so that (a) the head member is seated within the bore hole mouth, (b) the tail member is disposed within the bore hole below the head member and (c) the deflection anchors are each positioned at separate depths in the bore hole. The method may further include withdrawal of the transducer 96 through an access way in the head member without displacement any other components of the multi-depth deflectometer. The method may also include fabricating the multi-depth deflectometer 92 by the sub-steps of (a) attaching a rigid rod element to a deflection anchor, (b) passing the rigid rod element through a bore in the deflection anchor above its attached anchor in the alignment of anchors, and (c) positioning the deflection anchors in vertical-actuation communication with the respective displacement transducer of the assemblies.

The method preferably also includes, in the placement step, in order, (a) positioning the multi-depth deflectometer in a substantially prefabricated condition into the bore hole, (b) inflating the bottom anchor, and (c) placing the displacement transducers into the head member.

The method also preferably includes before the placement step, fabricating the multi-depth deflectometer, which fabrication preferably includes attaching the bottom anchor in deflated condition to the distal end of the lining, establishing the deflection anchors in the lining in modes of separate vertical actuation communication with the lining, and attaching the proximal end of the lining to the bottom of the head member. In the placement step, in preferred embodiments the method includes drilling a bore hole, placing the multi-depth deflectometer into the bore hole, inflating the bottom anchor, feeding a plugging agent into any clearance between the multi-depth deflectometer and the bore hole, and activating the plugging agent. In certain preferred embodiments, the bore hole is formed with a bore hole mouth of larger cross sectional diameter than the bore hole proper, and the multi-depth deflectometer is placed into the bore hole with the head member seated in the bore hole mouth. In other preferred embodiments, before the placement step, the method includes fabricating the multi-depth deflectometer by the sub-steps of (a) attaching each of the rigid rod elements to the deflection anchor of its assembly, (b) passing the rigid rod element through a bore in each of the deflection anchor above its deflection anchor in the longitudinal alignment of deflection anchors, and (c) positioning the deflection anchors of each assembly in vertical-actuation communication with the respective displacement transducer of the assemblies. In certain preferred embodiments, the method further includes, in the placement step, placing the displacement transducers of the assemblies into the head member after the multi-depth deflectometer is placed into the bore hole. In some preferred embodiments, the method of the present invention further includes (a) withdrawal of the transducers from the head member, preferably through an access way in the head member without displacement of the multi-depth deflectometer, (b) then leaving the multi-depth deflectometer in a non-use condition for a time interval, and (c) then placement of displacement transducers into the head member through the access way.

It is well within the skill of a person in the technical field, upon becoming conversant with, or otherwise having knowledge of, the present invention, to select suitable combinations of transducers/rods/anchors and the like in view of the type of MDD being designed and/or constructed.

The above described embodiments are exemplitive, and the terminology is employed for illustration purposes and not limitation purposes. The present invention is not limited to the combinations and subcombinations illustrated herein.

I claim:

1. A multi-depth deflectometer comprised of:
   a head member;
   an elongated tail member having a proximal end and a distal end, said tail member extending from said proximal end longitudinally downward from said head member;
   a plurality of independent displacement-transducer assemblages, each assemblage comprising a displacement transducer and a deflection anchor, said deflection anchor having a transverse-bite actuator and being in vertical-actuation communication with said transducer,
   said transducer of each assemblage being located within said head member;
   said deflection anchor of each assemblage being located in said tail member and being a member of a longitudinal alignment of said deflection anchors.

2. The multi-depth deflectometer of claim 1 wherein said tail member further includes a bottom anchor structure at about said distal end of said tail member.

3. The multi-depth deflectometer of claim 1 further including a bottom anchor in longitudinal alignment with said longitudinal alignment of said deflection anchors, wherein said longitudinal alignment of said deflection anchors is disposed between said head member and said bottom anchor.

4. The multi-depth deflectometer of claim 1 wherein at least one of said plurality of displacement-transducer assemblages further includes a rigid rod element having a first and a second opposed end, said rigid rod element being in vertical-actuation communication with the transducer of said assemblage at said first end and being affixed to the deflection anchor of said assemblage at said second end, said rigid rod element providing vertical-actuation communication between the transducer and the deflection anchor of said assemblage.

5. The multi-depth deflectometer of claim 1 wherein said plurality of displacement-transducer assemblages includes a first and a second displacement-transducer assemblage,
   said first assemblage being positioned closer to said head member than said second assemblage,
   said second assemblage further including a rigid rod element having a first and a second opposed end,
   said rigid rod element being in vertical-actuation communication with the transducer of said second assemblage at said first end and being affixed to the deflection anchor of said second assemblage at said second end,
   said rigid rod element providing vertical-actuation communication between the transducer and the deflection anchor of said second assemblage, and
   said rigid rod element passing through the deflection anchor of said first assemblage without affixation to the deflection anchor of said first assemblage.

6. The multi-depth deflectometer of claim 1 wherein said tail member further includes an elongated lining;
   said deflection anchors of said longitudinal alignment of deflection anchors being disposed within said elongated lining and being in vertical actuation communication with said lining.

7. The multi-depth deflectometer of claim 1 wherein said tail member further includes an elongated lining;
   said lining having an external high-friction surface;
   said deflection anchors of said longitudinal alignment of deflection anchors being disposed within said elongated lining and being in vertical actuation communication with said lining.

8. The multi-depth deflectometer of claim 1 wherein said plurality of displacement-transducer assemblages includes a first and a second displacement-transducer assemblage,
   said first assemblage being positioned closer to said head member than said second assemblage and includes a first transducer, a first deflection anchor and a first rigid rod element,
   said second assemblage includes a second transducer, a second deflection anchor and a second rigid rod element, said first and second rigid rod elements each separately having a proximal end and a distal end, said first and second rigid rod elements separately being in vertical-actuation communication with respectively said first and second transducer at said proximal ends of said first and second rigid rod elements and said first and second rigid rod elements separately being affixed to respectively said first and second deflection anchors at said distal ends of said first and second rigid rod elements, said first and second rigid rod element each separately providing vertical-actuation communication between respectively said first and second transducer and respectively said first and second deflection anchor, said second rigid rod element passing through said first deflection anchor without fixation to said first deflection anchor;

wherein said tail member further includes a bottom anchor structure, said bottom anchor structure being in vertical-actuation communication with a third displacement transducer through a third rigid rod element;

said third displacement transducer being located within said head element;

said head element further including a transversely-extending arm; and said third rigid rod element being in vertical-actuation communication with said third displacement transducer, being affixed to said bottom anchor structure and separately passing through said first and second deflection anchors without affixation to said first deflection anchor and without affixation to said second deflection anchor.

* * * * *